UNITED STATES PATENT OFFICE.

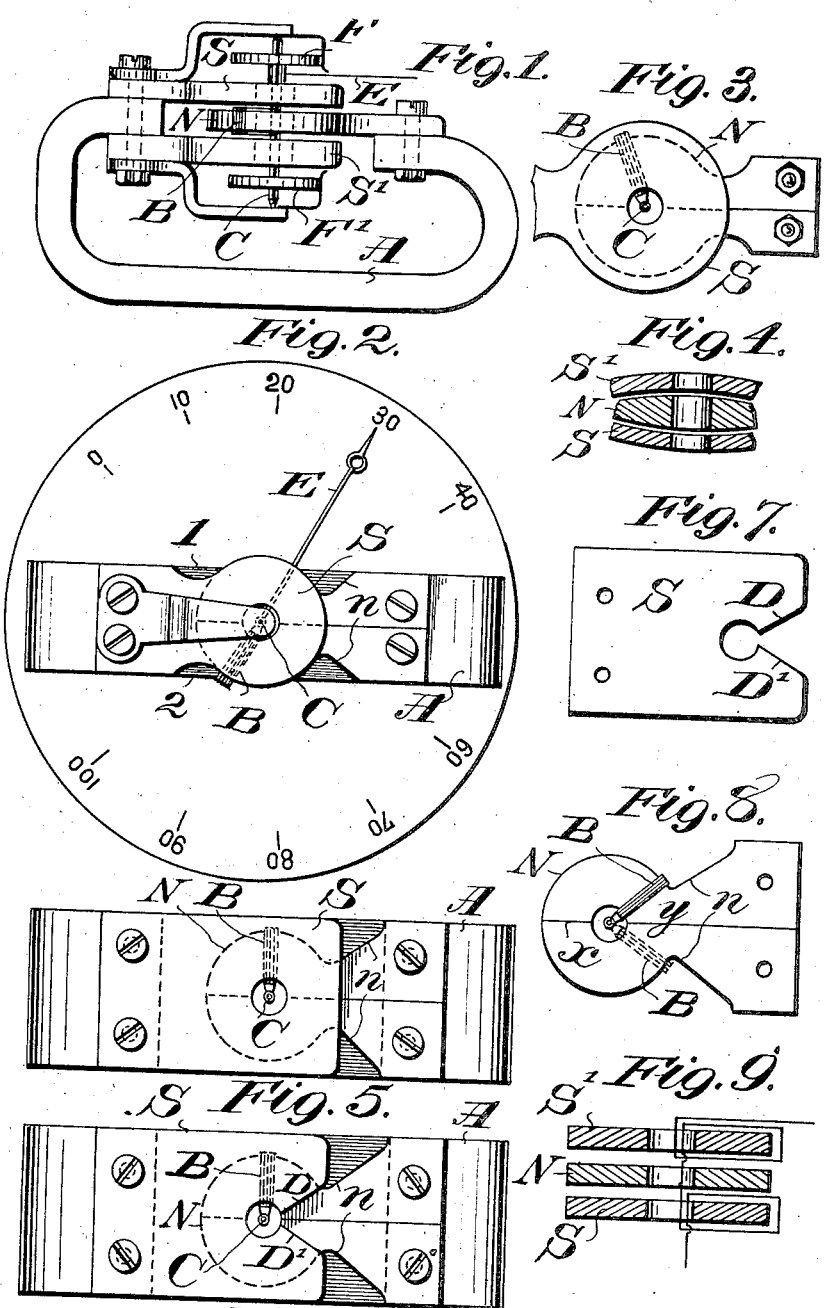

JOHN WESTMORELAND RECORD, OF BROADHEATH, NEAR MANCHESTER, ENGLAND.

ELECTRICAL MEASURING INSTRUMENT.

1,125,711. Specification of Letters Patent. Patented Jan. 19, 1915.

Application filed December 23, 1912. Serial No. 738,353.

*To all whom it may concern:*

Be it known that I, JOHN WESTMORELAND RECORD, a subject of the King of Great Britain and Ireland, and a resident of Broadheath, near Manchester, England, have invented new and useful Improvements in Electrical Measuring Instruments, of which the following is a specification.

This invention relates to improvements in that type of moving coil electrical measuring instrument in which the coil in its traverse passes at one part and at one part only through a space which is bounded by a junction of a pole piece with a magnet limb.

Such instruments as previously made have comprised two ring shaped pole pieces co-axially disposed relatively to each other, a coil encircling one ring and in its passage around such ring passing the junction of the other ring with its magnet. In such a construction the coil when passing the polar junction is exposed to a magnetic field which is of different intensity to that to which it is elsewhere exposed in its path, owing to the escape of magnetic lines of force from such polar junction to the other pole piece, such flux cutting the outer or cross windings of the coil as they pass through them.

My invention consists in nullifying or eliminating such polar junction magnetic flux, and thereby giving a magnetic field which is of practically constant density throughout the path of travel of the coil. This results in a very uniform graduation of scale being possible and also results in a greater sensitivity of instrument because the magnetic flux is much more usefully employed. This is accomplished by placing on the other side of the coil bearing pole piece, another pole piece similar to that which is already established on one side of the coil pole piece. By doing this the magnetic flux which has hitherto passed through the space bounded by the magnetic gap is usefully conducted by the iron of the second pole piece to the place where it can be usefully employed by passing directly through the annular gap between it and the coil bearing pole piece. With this arrangement and the consequent nullification or elimination of the flux from the space bounded by the polar junction a magnetic field which is of practically constant density throughout the path of the coil is obtained with the result that the graduations of the instrument scale are about constant throughout the range of the instrument. Additional sensitivity and regularity of movement of the coil may be obtained by giving the coöperating and relatively laterally disposed coöperating pole pieces the dimensions and forms hereinafter described.

The accompanying drawings illustrate how my invention may be carried into effect.

Figure 1 is a plan view of one form of the magnet and pole pieces of the instrument. Fig. 2 illustrates the same magnet and pole pieces in elevation. Fig. 3 illustrates in elevation a modification in the pole pieces. Fig. 4 represents in section a further modification of the pole pieces. Fig. 5 is a view in elevation of another magnet with still further modified pole pieces. Fig. 6 is a view in elevation of a magnet with further modifications in the pole pieces. Fig. 7 is a view of one of the coöperating pole pieces of Fig. 6 detached from its magnet. Fig. 8 is a view of a ring shaped pole piece detached from its magnet. Fig. 9 illustrates a modification in the mode of mounting the moving coil.

Like letters of reference indicate like parts where they occur in the different figures.

Referring first to Figs. 1 and 2. A is the permanent magnet having a ring shaped pole piece N of one polarity. The moving coil B is placed upon and passes through the pole piece and rotates upon and with the spindle C. S and $S^1$ are pole pieces of opposite polarity to N and placed one on each side of it. The spindle C passes through all the pole pieces. The pole pieces S $S^1$ are placed sufficiently far from the pole piece N to permit free passage or movement of the sides of the coil as it moves from one to another of its two extreme positions shown in broken and full lines in Fig. 8, but are otherwise as close as they can be to the pole piece N and to the coil B to give as great an intensity as possible to the magnetic field in which the coil moves.

In Figs. 1 and 2 the pole pieces S $S^1$ are shown as being ring shaped and of the same diameter as the ring pole piece N. But the pole pieces S $S^1$ may be of larger diameter than N as shown in Fig. 3. With the larger pole pieces S $S^1$ of Fig. 3 the cross windings of the coil B which pass over and across the periphery of the ring N are always in an active and constant magnetic field. They are not always in an active and constant field with the dimensions of pole pieces shown in Figs. 1 and 2, because when passing between the points 1 and 2 indicated in Fig. 2 the cross windings are exposed to magnetic flux from the necks by which the pole pieces S S¹ are connected to the magnet and are not exposed to such flux when passing between either of the points 1 or 2 and the neck $n$ of the pole piece N.

In the figures already referred to the various pole pieces have had their opposed faces flat and parallel to each other. In the form of pole pieces shown in Fig. 4 each of the pole pieces S S¹ has a concave inner face and the outer faces of the pole piece N are correspondingly convex.

Instead of the outer pole pieces S S¹ being ring shaped to correspond with the pole piece N they may be of any other desired form. In Fig. 5 one of them S is shown as being an approximately rectangular plate. This plate and the other like plate S¹ are of greater width than the circle described by the outer cross windings of the coil so that such cross windings are always in an active magnetic field.

It will be seen clearly from Fig. 8 that the arc of movement of the coil is only limited by the coil coming into contact with one side or other of the neck $n$ of the pole piece N. The two extreme positions of the coil are shown by representations of the coil in broken and full lines. It will be seen that there is thus an angular area $y$ of the pole piece N which the coil never moves over. The magnetic flux which takes place between this angular area and the opposite portions of the pole pieces S S¹ is therefore wasted.

The pole piece S shown in Fig. 6 (and also the pole piece S¹ which is not visible) has a gap cut in and through it bounded by the walls D D¹, this gap corresponding in form and area and being opposite to the angular area $y$ of the pole piece N. With the gap thus formed there is no (or very little) magnetic flux from the described angular area $y$ of the pole piece N, and the flux which has hitherto been wasted at this part is diverted to and utilized in those portions of the annular spaces between pole pieces which are traversed by the coil.

The pole piece S is shown detached in Fig. 7.

The magnetic gap bounded by the walls D D¹ need not have the form and area of the angular area $y$ of the pole piece N. It may have other forms and still achieve the same object of preventing magnetic flux from the angular area $y$.

A magnetic gap is only shown as being formed in a rectangular pole piece S or S¹ of Figs. 6 and 7 but it may also be formed in the ring shaped pole pieces S S¹ of Figs. 1 to 4.

The ring shaped pole piece N may be divisible along the line $x$, Fig. 8, so that its parts can be separated to permit the coil to be put in place and removed.

In the forms of instrument described the coil has moved on an inner ring shaped pole piece contained between two other pole pieces. But the coil may, if desired, be in duplicate and rotate around outer rings S S¹. See Fig. 9.

In Fig. 2 a pointer or needle E attached to the spindle C is illustrated, and a disk graduated for showing variations of current. The markings on the disk are at regular distances, or nearly so, apart to indicate like variations in the strength of the current passing through the coil.

F F¹ are spiral tension springs by which the spindle and coil are held in or returned to their zero position, and these springs may serve to conduct current to and from the coil, or other connecting devices may be used.

What I claim is:—

1. In an electrical measuring instrument, the combination with a magnet having two magnetic limbs to which the pole pieces are adapted to be secured, an annular pole piece secured to one of said limbs, a coil mounted for angular movement surrounding said pole piece, said other magnetic limb being in a position for its flux to effect the coil in a part only of its angular movement, of two pole pieces secured to said last named limb one opposite each face of the annular pole piece and arranged in close proximity thereto to thereby prevent the flux from said last mentioned magnetic limb effecting the coil and rendering the flux which effects the coil substantially uniform throughout the angular movement thereof.

2. In an electrical measuring instrument, the combination with a magnet having two magnetic limbs to which the pole pieces are adapted to be secured, an annular pole piece secured to one of said limbs, a coil mounted for angular movement surrounding said pole piece, said other magnetic limb being in a position for its flux to effect the coil in a part only of its angular movement, of two pole pieces secured to said last named limb one opposite each face of the annular pole piece and of sufficient size to overlie the same to thereby prevent the flux from the magnetic limb effecting the coil and to render the flux which effects the coil substantially uniform throughout the angular movement of the same.

3. In an electrical measuring instrument, the combination with a magnet having two magnetic limbs to which the pole pieces are adapted to be secured, an annular pole piece having a neck which is secured to one of the limbs, a coil mounted for angular movements surrounding said pole piece, said other magnetic limb being in a position for its flux to effect said coil in a part only of its angular movement, of two pole pieces secured to said last named limb one opposite each face of the annular pole piece and arranged in close proximity thereto each of said outer pole pieces being cut away opposite the neck by which the annular pole piece is secured to the magnetic limb to form a magnetic gap whereby the flux from the last named magnetic limb is prevented from effecting the coil during its angular movement.

In witness whereof I have hereunto set my hand in the presence of two subscribing witnesses.

JOHN WESTMORELAND RECORD.

Witnesses:
 WILLIAM GEO. HEYS,
 JOHN O'CONNELL.